Patented May 23, 1933

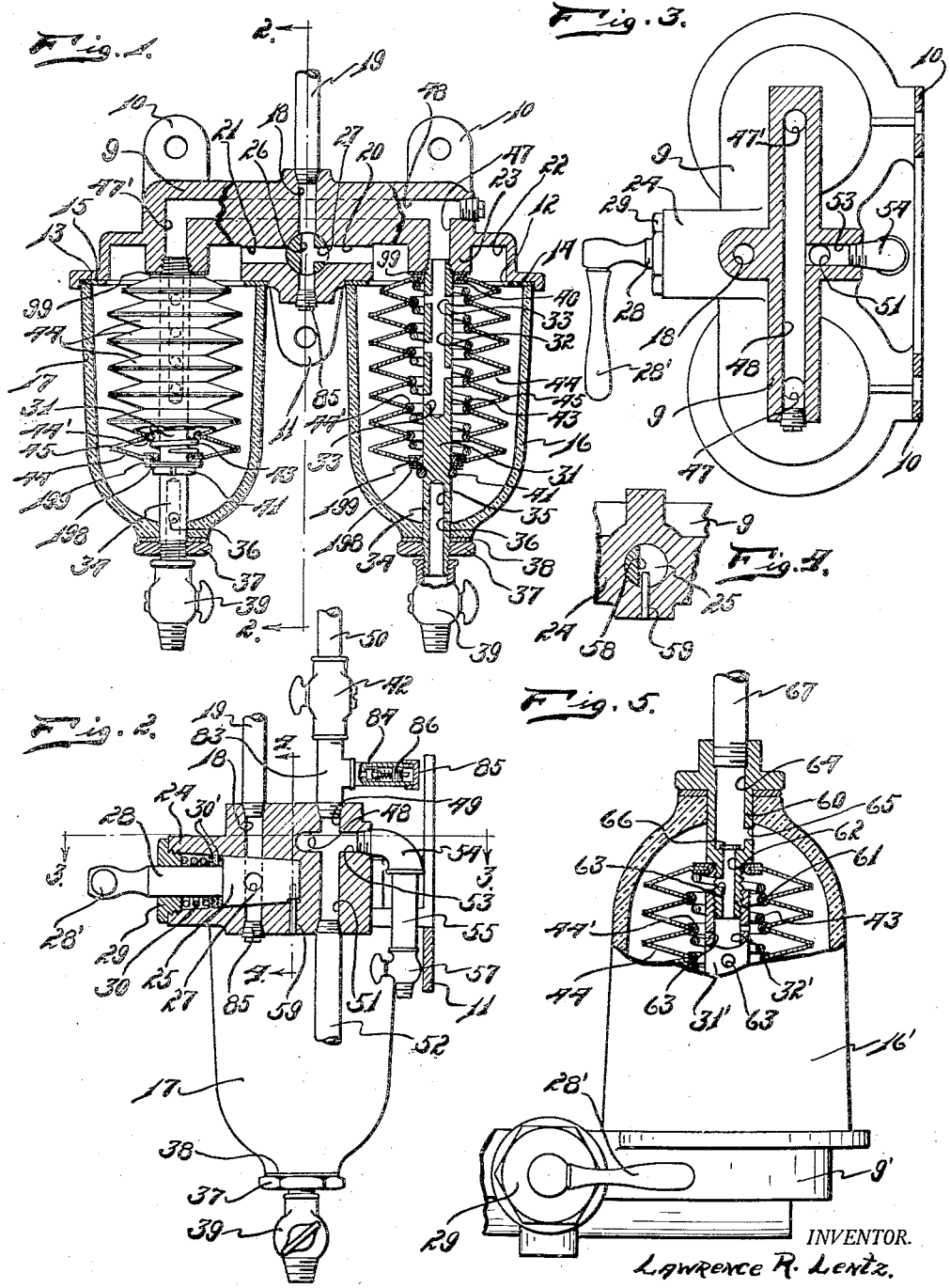

1,910,553

UNITED STATES PATENT OFFICE

LAWRENCE R. LENTZ, OF WINDSOR, ONTARIO, CANADA

FILTER

Application filed October 29, 1930. Serial No. 491,835.

My invention relates to a new and useful improvement in a filter adapted for filtering liquids of various kinds and particularly gasoline, oil, etc. The invention is especially well adapted for filtering liquid fuel used in internal combustion engines and lends itself well to use on automobiles and aeroplanes.

In the invention I use as a filtering element a flexible member and preferably one formed from chamois or other material possessed of the necessary and desired filtering qualities. In a filter element of this class, for efficient operation, it is necessary that the filtering element permit the passage of liquid fuel therethrough and prevent the passage of water and liquids other than the liquid fuel as well as solid particles. A good grade of chamois skin in its unstretched condition has proven most acceptable for filtering purposes. It has been found that when the filtering element is possessed of the characteristics necessary to render the filtering efficient and proper that the filtering element is impervious to air and fuel vapors under the normal fuel delivery pressure. By this I mean that the fuel vapors forming in the filter receptacle or within the filter element itself will not be permitted to pass through the filter element by the pressure which is directed against the same or by the pressure which is built up in the receptacle or filter element by the pressure head of the fuel delivered to the receptacle. An object of this invention, therefore, is the provision in a filter of this class of a filter element normally impervious to fuel vapors at normal fuel delivery pressures.

It has been found that in use when the filter element becomes heated the fuel vapors form both in the filter receptacle and within the filter element itself and that in time these vapors become voluminous enough to produce an air lock and to prevent flow of fuel from the filter, resulting in a stopping of the engine with which the filter is used. It is an object of the invention to provide a filter of this class whereby a free and continuous flow of fuel from the filter may be effected at all times regardless of the temperatures within the filter or surrounding the filter.

It is another object of the invention to provide a filter of this class so constructed and arranged that escape of fuel vapors from around and from within the filter may be effected at all times.

Another object of the invention is the provision of a filter which will permit the easy and quick draining of the filter receptacle and of the filter itself.

Another object of the invention is the provision of a dual filter so arranged and constructed that either filter element may be used when desired without necessitating a cessation of flow of fuel from the filter to the engine with which used.

Another object of the invention is the provision of a filter of this class which will be simple in structure, economical of manufacture, durable, efficient in use and compact.

Other objects will appear hereinafter.

The invention consists in the combination and arrangement of parts hereinafter described and claimed.

The invention will be best understood by a reference to the accompanying drawing which forms a part of this specification, and in which, Fig. 1 is a central vertical sectional view of the invention.

Fig. 2 is a view taken on line 2—2 of Fig. 1.

Fig. 3 is a view taken on line 3—3 of Fig. 2.

Fig. 4 is a fragmentary sectional view taken on line 4—4 of Fig. 2.

Fig. 5 is a side elevational view of a modified form with a part broken away and a part shown in section.

The invention comprises a head 9 having fastening brackets 10 and 11 projecting therefrom. One face of the head is recessed as at 12 and 13 for reception of gaskets 14 and 15 against which may engage the open ends of the bell shaped receptacles 16 and 17. In the drawing I have illustrated a dual filter having two elements which may be used alternately or simultaneously, and a description of one element generally will suffice as a description for the other element.

A fuel delivery pipe 19 connects to the head 9 in communication with the passage 18 extending laterally from which are the passages 20 and 21 each communicating with the chamber 22 formed around the depending neck 23 which is positioned centrally of the receptacles 16 and 17.

Projecting outwardly from the head 9 is a neck 24. A stop cock is used to control communication of the passage 18 with the passages 20 and 21. This stop cock has a plug 25 provided with the diametrically extending passage 26 and the radial passage 27 communicating therewith. Projecting from the plug 25 is a stem 28 which extends through the cap 29 threaded into the neck 24 and against which engages one end of the spring 30, the other end of which engages against washers 30' to serve to press the plug 25 inwardly and maintain a tight leakproof connection. The handle 28' serves as a means for rotating the valve, and a pin 59 mounted in the head extends into a cut away portion 58 of the plug to limit the rotation of the plug in either direction. By means of the valve, the flow of liquid fuel through the pipe 19 may be directed into either the receptacle 16 or the receptacle 17, or both, at will.

Extending axially of the receptacle 16 and threaded into the neck 23 is a stack 31 having a central passage 32 formed therein throughout a portion of its length communicating with which are the openings 33.

The stack 31 has, at its lower end, a passage 35 extending a portion of its length and communicating through an opening 36 with the interior of the receptacle or housing 16. This lower part of the stack 31 projects through and extends exteriorly of the housing or receptacle 16 and threaded on the outer end thereof is a nut 37 which serves to clamp the gasket 38 against the end of the receptacle or housing 16. Mounted on the exterior end of the stack 31 is a stop cock 39 through which the receptacle 16 may be drained.

Positioned within the receptacle or housing 16 in embracing relation on the stack 31 is a coil spring 43. This coil spring is positioned within the filter element. The filter element is as shown in Fig. 1 of bellows-like formation and is formed from a flexible filter element such as buckskin or chamois. Any suitable material may be used which will serve to filter solid particles from the liquid fuel and which will also be impervious at ordinary fuel delivery pressures, when saturated with a liquid, to fuel vapors and to air. When the filter is formed from unstretched chamois or unstretched buckskin and is then saturated with gasoline, the filter element is impervious to other liquids under normal fuel delivery pressure. It will be noted that the lowermost opening 33 is spaced considerably above the bottom of the receptacle 16 so as to provide for an accumulation of considerable quantity of foreign liquid in the bottom of the receptacle 16. This filter element is made from a plurality of circular sections 44, the outer edges 45 of adjacent sections being secured together by stitching or in any other suitable manner. Each of these sections is provided with a central opening, the edges of adjacent sections at the opening being secured together preferably by a metallic grommet 44'. This grommet is of a diameter slightly less than the diameter of the coil spring 43 so that the coil spring which engages opposite ends of the filter element serves not only to maintain these ends in spaced relation but also serves as a guide to retain the various sections of the filter element in spaced relation. The upper end of the filter element is provided with a flat grommet 40 which presses against a chamois washer 99 which engages the end of the neck 23. The lower end of the filter element engages a chamois washer 199 which engages a metal washer 198 resting on a collar 41 fixedly mounted on the stack 31. This arrangement forms an air tight connection at both ends of the filter element. The stack 31 communicates with the passage 47 formed in the head 9. This passage 47 communicates with the passage 48 which also communicates with the passage 47'. The passage 48 communicates with the passage 51 into which connects the fuel delivery or outlet pipe 52 which serves to conduct the filtered fuel to its point of combustion. Connected to a T 83 communicating with the passage 49 which communicates with the passage 48 is a vent pipe 50 which extends to a point above the fuel level of the fuel reservoir or container from which the fuel is delivered to the filter, and this pipe 50 preferably terminates within the reservoir or fuel container. A stop cock 42 is interposed in the pipe 50. Communicating with the passage 48 is a passage 53 connected in which is the L 54 to which is connected the pipe 55 provided with a stop cock 57, to provide a means for draining off filtered fuel.

The construction is such that when fuel is delivered into the housing or receptacle 16 or 17, depending upon the position of the valve plug 25, the fuel will pass through the filter element into the interior thereof. Air or vapor in the housing or receptacle 16 or 17 will bubble upwardly through the pipe 19. The filtered fuel will be withdrawn through the passages 47, 48 and 51 through the pipe 52, and fuel vapor and air within the filter will, when reaching the passage 49, escape through the pipe 50. There is thus provided a mechanism whereby air and fuel vapor may escape freely at all times from the housing or receptacle which surrounds the filter and from within the filter. Thus there is no "air lock" at any part of the filter mechanism and a continuous and free flow of the fuel to the engine is permitted.

A pipe 84 connects with and extends laterally from the T 83 and is provided with a cap 85. Positioned in the pipe 84 is a valve mechanism 86.

When the receptacle 16 or 17 is being drained, the filter element itself may also be cleaned by attaching an air hose through which compressed air may be delivered through the pipe 84 and forcing the air through the filter element to remove from the surface thereof such solid matter as may have adhered thereto.

In Fig. 5 I have shown a slightly modified form in which the receptacle or housing 16 is in upright position. When inverted in this manner, the plug 85 (shown in Fig. 1) and the pipe 19 are transposed. The stack extension 60 is provided with the reduced threaded portion 61 which threads into the stack 31' provided with the passage 32' in communication with the passage 62 formed in the reduced portion 61. This passage 62 is in communication with the filter element through the opening 63 so that fuel vapor arising within the filter element may enter the passage 62 through the opening 63 and pass into the chamber or passage 64 and escape through the vent pipe 67. The passage or chamber 64 in the stack extension 60 is also in communication with the interior of the receptacle or housing 16 through the opening 65 and the disk valve 66 prevents passage of liquid from the receptacle or housing 16 into the interior of the filter element through the passage 62.

While I have illustrated and described the preferred form of construction of my invention, I do not wish to limit myself to the precise details of structure shown but desire to avail myself of such variations and modifications as may come within the scope of the appended claims.

Having thus described my invention what I claim as new and desire to secure by Letters Patent is:

1. In a filter of the class described, a head; a receptacle mounted on said head, said head having an inlet passage communicating with a lateral passage in communication with said receptacle; a hollow filter element in said receptacle in communication with an outlet passage formed in said head, said outlet passage communicating with an air relief passage in said head; and a pipe mounted in said air relief passage and extended upwardly from said head.

2. In a filter of the class described, a head; a receptacle mounted on said head, said head having an inlet passage communicating with a lateral passage in communication with said receptacle; a hollow filter element in said receptacle in communication with an outlet passage formed in said head, said outlet passage communicating with an air relief passage in said head; a pipe mounted in said air relief passage and extended upwardly from said head; an outlet conduit communicating with said outlet passage; an auxiliary outlet conduit communicating with said outlet passage; and a valve normally closing the end of said auxiliary outlet conduit.

In testimony whereof I have signed the foregoing specification.

LAWRENCE R. LENTZ.